US010256750B2

(12) United States Patent
Ma et al.

(10) Patent No.: US 10,256,750 B2
(45) Date of Patent: Apr. 9, 2019

(54) ELECTRONIC DEVICE HAVING DELAY CIRCUIT FOR SYNCHRONOUS STARTING OF TWO OPERATING COMPONENTS

(71) Applicant: JOHNSON ELECTRIC INTERNATIONAL AG, Murten (CH)

(72) Inventors: Hai Bo Ma, Hong Kong (CN); Yuk Tung Lo, Hong Kong (CN); Ka Lung Ng, Hong Kong (CN); Yu Quan Liang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/288,726

(22) Filed: Oct. 7, 2016

(65) Prior Publication Data

US 2017/0104427 A1   Apr. 13, 2017

(30) Foreign Application Priority Data

Oct. 9, 2015 (CN) .......................... 2015 1 0648593

(51) Int. Cl.
| | |
|---|---|
| *H03K 3/01* | (2006.01) |
| *H02P 1/16* | (2006.01) |
| *H02P 6/26* | (2016.01) |
| *H02P 6/20* | (2016.01) |
| *H02P 27/06* | (2006.01) |

(52) U.S. Cl.
CPC ................ *H02P 1/16* (2013.01); *H02P 6/20* (2013.01); *H02P 6/26* (2016.02); *H02P 27/06* (2013.01)

(58) Field of Classification Search
CPC .............. H02P 1/16; H02P 27/06; H02P 6/20
See application file for complete search history.

(56) References Cited

U.S. PATENT DOCUMENTS

| | | | | |
|---|---|---|---|---|
| 5,574,344 | A * | 11/1996 | Matsuoka | .............. B62D 5/046 318/291 |
| 6,262,546 | B1 * | 7/2001 | Draves | ...................... H02P 7/04 318/293 |
| 6,479,956 | B1 * | 11/2002 | Kawabata | ............... H02P 6/085 318/400.12 |
| 2002/0033716 | A1 * | 3/2002 | Chrappan Soldavini | ..................... H02M 1/08 327/79 |
| 2003/0067243 | A1 | 4/2003 | Hollenbeck et al. | |

FOREIGN PATENT DOCUMENTS

EP           0851570 A1    7/1998

* cited by examiner

*Primary Examiner* — Muhammad S Islam
(74) *Attorney, Agent, or Firm* — Muncy, Geissler, Olds & Lowe, P.C.

(57) ABSTRACT

A circuit includes a first operating component, a second operating component and a starting time control circuit. The starting voltage of the first operating component is different from that of the second operating component, and the starting time control circuit is configured to regulate a starting time of the first operating component to be synchronous with that of the second operating component.

12 Claims, 3 Drawing Sheets

ELECTRONIC DEVICE HAVING DELAY CIRCUIT FOR SYNCHRONOUS STARTING OF TWO OPERATING COMPONENTS

CROSS REFERENCE TO RELATED APPLICATIONS

This non-provisional patent application claims priority under 35 U.S.C. § 119(a) from Patent Application No. CN201510648593.7 filed in The People's Republic of China on Oct. 9, 2015.

TECHNICAL FIELD

The present disclosure relates to an electronic device and a circuit.

BACKGROUND

At present, electronic devices such as hair dryers, vacuum cleaners, and power tools generally have a number of operating components. Generally, starting voltages of the operating components are not the same, which causes the operating components to start successively, after a system is powered on. In some cases, starting times of associated operating components being not the same tends to cause various problems.

SUMMARY

An electronic device regulating device is provided according to an embodiment of the present disclosure, which includes a motor and a motor drive circuit. The motor drive circuit includes a first operating component and a second operating component. The motor drive circuit includes a time delay circuit configured to delay a starting time of the first operating component to be synchronous with that of the second operating component.

Preferably, further comprising a rectifier, wherein the rectifier comprises a first output terminal and a second output terminal; and the time delay circuit is connected in series with the first operating component, a series branch of the time delay circuit and the first operating component is connected in parallel with the second operating component across the first output terminal and the second output terminal, and the time delay circuit is configured to adjust a voltage outputted by the first output terminal and provide the adjusted voltage for the first operating component, so that a voltage provided for the first operating component can rise to a starting voltage of the first operating component when a voltage provided for the second operating component by the first output terminal rises to a starting voltage of the second operating component.

Preferably, the time delay circuit comprises a voltage division unit and a power-on unit, the voltage division unit has a turn-on voltage, and is turned on and clamped at the turn-on voltage in a case that a voltage applied to the voltage division unit is higher than or equal to the turn-on voltage, and the power-on unit is configured to generate a voltage and provide the voltage for the first operating component, after the voltage division unit is turned on, wherein a sum of the turn-on voltage of the voltage division unit and the starting voltage of the first operating component is equal to the starting voltage of the second operating component.

Preferably, the voltage division unit comprises a Zener diode, the power-on unit comprises a resistor, a cathode of the Zener diode is electrically connected to the first output terminal, an anode of the Zener diode is electrically connected to the first operating component and electrically connected to the second output terminal via the resistor, and a breakdown voltage of the Zener diode is a difference between the starting voltage of the second operating component and that of the first operating component.

Preferably, further comprising an inverter connected the motor, wherein the first operating component is a position detector and motor driver configured to detect a rotational position of a rotor of the motor and output trigger signals, the second operating component is a switch driver configured to drive the inverter to convert a direct current into an alternating current.

Preferably, the starting voltage of the first operating component is lower than that of the second operating component.

Preferably, the inverter is an H-bridge circuit comprising a number of semiconductor switch transistors, the semiconductor switch transistors are MOSFETs, and the switch driver is a MOSFET driver.

Preferably, the motor is a single phase direct current brushless motor.

A circuit is provided according to another embodiment of the present disclosure, which includes a first operating component, a second operating component and a starting time control circuit. The starting voltage of the first operating component is different from that of the second operating component, and the starting time control circuit is configured to regulate a starting time of the first operating component to be synchronous with that of the second operating component in an electronic device.

BRIEF DESCRIPTION OF THE DRAWINGS

The present disclosure is further described hereinafter in conjunction with drawings of the specification and some embodiments.

DETAILED DESCRIPTION OF THE EMBODIMENTS

Figure 1:
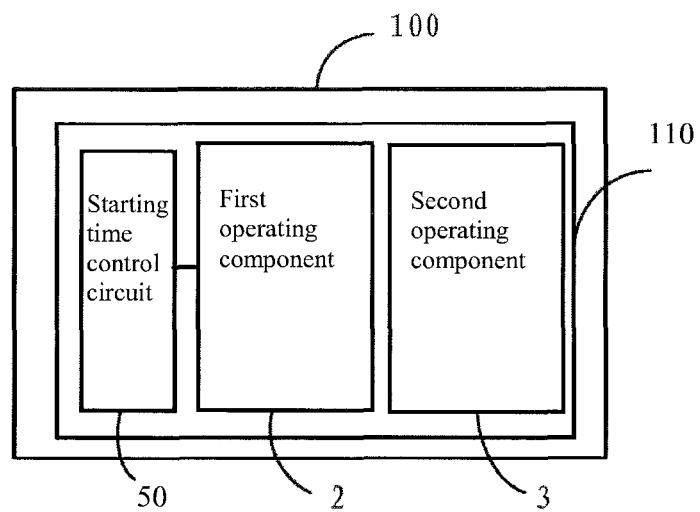
FIG. 1 is a functional module diagram of some components of an electronic device according to an embodiment of the present disclosure.

Reference is made to FIG. 1, which is a functional module diagram of some components of an electronic device 100 according to an embodiment of the present disclosure. The electronic device 100 includes a circuit 110. The circuit 110 includes a starting time control circuit 50, a first operating component 2 and a second operating component 3. Preferably, the starting time control circuit 50 is a time delay circuit configured to regulate a starting time of the first operating component 2 to be synchronous with that of the second operating component 3.

Figure 2:
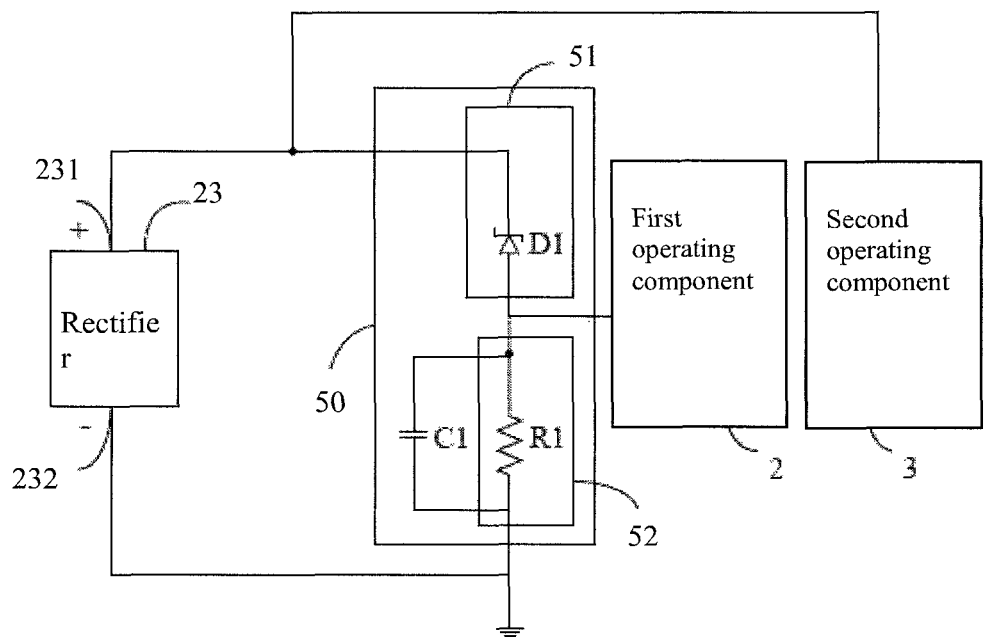
FIG. 2 is a detailed diagram of a circuit in an electronic device.

Reference is made to FIG. 2, which is a detailed diagram of a circuit 110 in an electronic device 100 according to an embodiment of the present disclosure. As shown in FIG. 2, the electronic device 100 further includes a rectifier 23 which includes an anode output terminal 231 and a cathode output terminal 232 and is configured to access a supply voltage. The first operating component 2 has a first starting voltage, and the second operating component 3 has a second starting voltage which is higher than the first starting voltage. The starting time control circuit 50 is connected in series with the first operating component 2, and a series branch of the starting time control circuit 50 and the first operating component 2 is connected in parallel with the second operating component 3 across the anode output terminal 231 and the cathode output terminal 232 of the rectifier 23. The starting time control circuit 50 is configured to adjust a voltage outputted by the anode output terminal 231 of the rectifier 23 and provide the adjusted voltage for the first operating component 2 so that a voltage provided for the first operating component 2 can rise to the starting voltage of the first operating component 2 when a voltage provided for the second operating component 3 by the anode output terminal 231 rises to the starting voltage of the second operating component 3.

Specifically, the starting time control circuit 50 includes a voltage division unit 51 and a power-on unit 52 which are connected in series across the anode output terminal 231 and the cathode output terminal 232 of the rectifier 23. The second operating component 3 is directly connected to the anode output terminal 231 of the rectifier 23. The voltage division unit 51 has a turn-on voltage, and in a case that a voltage applied to the voltage division unit 51 is higher than or equal to the turn-on voltage, the voltage division unit 51 is turned on and clamped at the turn-on voltage. The turn-on voltage is a partial voltage shared by the voltage division unit 51 of an output voltage of the anode output terminal 231. The power-on unit 52 is configured to generate a voltage and provide the voltage for the first operating component 2, after the voltage division unit 51 is turned on.

A sum of the turn-on voltage of the voltage division unit 51 and the starting voltage of the first operating component 2 is equal to the starting voltage of the second operating component 3. Therefore, in a case that a voltage outputted by the rectifier 23 is higher than the turn-on voltage of the voltage division unit 51, the voltage division unit 51 is turned on and clamped at the turn-on voltage, and if the voltage outputted by the rectifier 23 continues rising, an increment of the voltage will be applied to the power-on unit 52. In a case that the voltage outputted by the rectifier 23 continues rising till a voltage of the power-on unit 52 is equal to the starting voltage of the first operating component 2, the first operating component 2 starts to operate. That is, when the voltage provided for the first operating component 2 is equal to a first preset value (i.e. the starting voltage of the first operating component 2), the first operating component 2 is started. In this case, the voltage outputted by the rectifier 23 is equal to the sum of the starting voltage of the first operating component 2 and the turn-on voltage of the voltage division unit 51, that is, equal to the starting voltage of the second operating component 3, and the second operating component 3 starts at the same time. That is, when the voltage provided for the second operating component 3 is equal to a second preset value (i.e. the starting voltage of the second operating component 3), the second operating component 3 is started. Thereby, synchronous starting of the first operating component 2 and the second operating component 3 is achieved.

In an example, the voltage division unit 51 includes a Zener diode D1, and the power-on unit 52 includes a resistor R1. A cathode of the Zener diode D1 is connected to the anode output terminal 231, and an anode of the Zener diode D1 is connected to the first operating component 32 and connected to the cathode output terminal 232 of the rectifier 23 via the resistor R1. A breakdown voltage of the Zener diode D1 is a difference of the starting voltage of the second operating component 33 and that of the first operating component 32. Thereby in a case that the voltage outputted by the rectifier 23 is higher than the breakdown voltage of the Zener diode D1, the Zener diode D1 is conductive, the resistor R1 generates a voltage. In a case that the voltage outputted by the rectifier 23 is equal to a sum of the breakdown voltage of the Zener diode D1 and the starting voltage of the first operating component 32, the voltage generated by the resistor R1 is the starting voltage of the first operating component 32, thereby driving the first operating component 32 to start.

Figure 3:
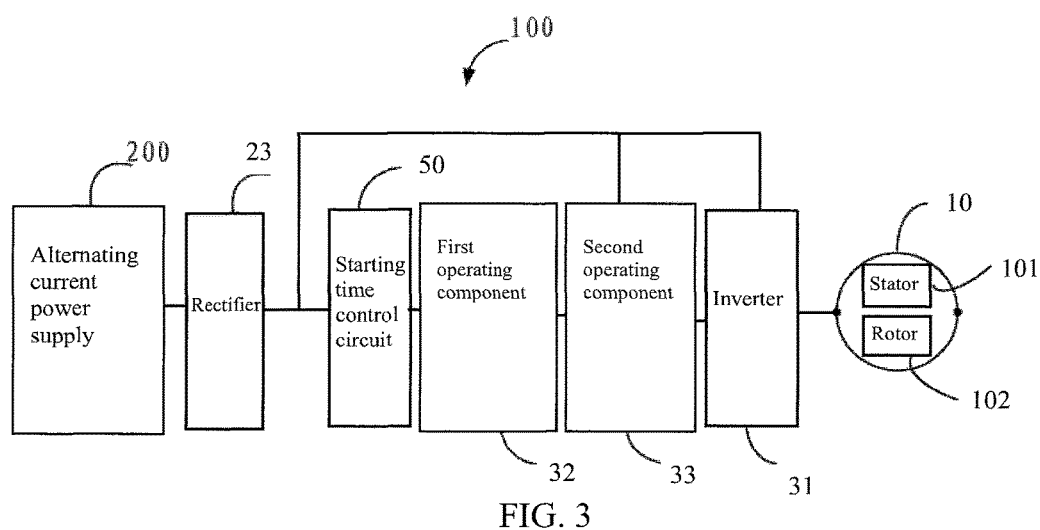
FIG. 3 is a block circuit diagram of an electronic device according to an embodiment of the present disclosure.

Reference is made to FIG. 3, which is a block circuit diagram of an electronic device 100 according to an embodiment of the present disclosure. In the embodiment, the electronic device 100 further includes a motor 10 and an inverter 31, and the motor 10 includes a stator 101 and a rotor 102 which rotates relative to the stator 101. Specifically, the first operating component 2 is a position detector and motor driver 32, and the second operating component 3 is a switch driver 33. The electronic device 100 may be any suitable device with the motor 10, such as an hair dryer, a vacuum cleaner, a power tool, or an air conditioner.

In the embodiment, the rectifier 23 is an AC to DC converter which is configured to access an alternating current power supply 200 and convert an alternating supply voltage provided by the alternating current power supply 200 into a direct voltage. The inverter 31 is electrically connected between the rectifier 23 and the motor 10. The position detector and motor driver 32 is configured to detect a rotational position of the rotor 102 of the motor 10 and output trigger signals. The switch driver 33 is electrically connected to both the inverter 31 and the position detector and motor driver 32 and configured to drive, based on the rotational position of the rotor 102 detected by the position detector and motor driver 32, the inverter 31 to convert a direct current generated by the rectifier 23 into an alternating current, thereby driving the rotor 102 to keep rotating.

The alternating current power supply 200 is preferably a mains supply, such as a mains supply with a voltage of 120V (volt) or 230V.

Figure 4:
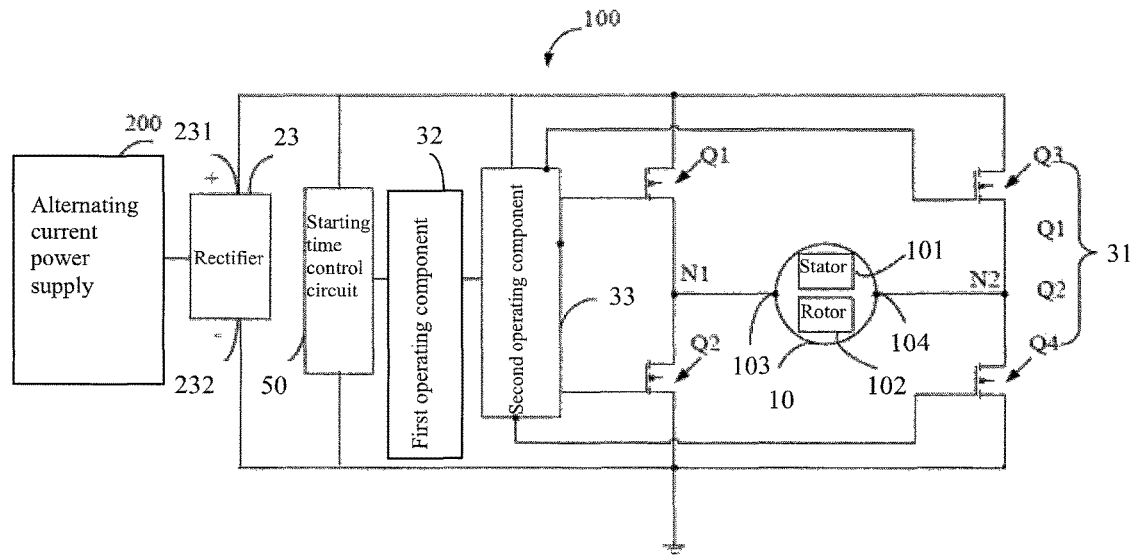
FIG. 4 is a detailed circuit diagram of an electronic device according to an embodiment of the present disclosure.

Specifically, as shown in FIG. 4, the motor 10 includes a first electrode terminal 103 and a second electrode terminal 104, the stator 101 includes a winding 1011, and two terminals of the stator 101 are electrically connected to the first electrode terminal 103 and the second electrode terminal 104, respectively. The inverter 31 according to the present disclosure is an H-bridge circuit, which is electrically connected between the anode output terminal 231 and the cathode output terminal 232 of the rectifier 23, the first electrode terminal 103 and the second electrode terminal 104, and configured to establish a first power supply path or a second power supply path between the anode output terminal 231 and the cathode output terminal 232 of the rectifier 23, the first electrode terminal 103 and the second electrode terminal 104.

The position detector and motor driver 32 is configured to detect a rotational position of the rotor 102 of the single-phase direct current brushless motor 10, generate a first trigger signal or a second trigger signal and transmit the same to the switch driver 33. In a case that the first trigger signal is received, the switch driver 33 drives the inverter 31 to establish the first power supply path. In a case that the second trigger signal is received, the switch driver 33 drives the inverter 31 to establish the second power supply path.

In the first power supply path, the anode output terminal 231 and the cathode output terminal 232 of the rectifier and filter circuit 23 are respectively connected to the first electrode terminal 103 and the second electrode terminal 104. In the second power supply path, the anode output terminal 231 and the cathode output terminal 232 of the rectifier and filter circuit 23 are respectively connected to the second electrode terminal 104 and the first electrode terminal 103.

In the embodiment, the rotor 102 includes a permanent magnet and can rotate relative to the stator 101. The position detector and motor driver 32 is arranged near the single-phase direct current brushless motor 10, generates the first trigger signal in a case that an N magnetic pole of the rotor 102 is detected, and generates the second trigger signal in a case that an S magnetic pole of the rotor 102 is detected. Thereby, each time the N or S magnetic pole of the rotor rotates to near the position detector and motor driver 32, the position detector and motor driver 32 generates a corresponding trigger signal and triggers the switch driver 33 to drive the inverter 31 to establish a corresponding power supply path. Thereby, a positive polarity and a negative polarity of a power supply provided for the first electrode terminal 103 and the second electrode terminal 104 of the single-phase direct current brushless motor 10 are interchanged, so that a direction of a current flowing through the winding 1011 of the stator 101 can change alternately to generate an alternating magnetic field to drive the rotor 102 to keep rotating. It should be understood that, in an alternative embodiment, the position detector and motor driver 32 may generate the first trigger signal in a case that the S magnetic pole of the rotor 102 is detected, and generate the second trigger signal in a case that the N magnetic pole of the rotor 102 is detected.

In the preferred embodiment, the motor 10 is a single phase direct current brushless motor, the numbers of magnetic poles of the stator and magnetic poles of the rotor are the same and not greater than 6.

Specifically, as shown in FIG. 4, in the embodiment, the inverter 31 is an H-bridge circuit, which includes a first semiconductor switch Q1, a second semiconductor switch Q2, a third semiconductor switch Q3 and a fourth semiconductor switch Q4. The first semiconductor switch Q1 and the second semiconductor switch Q2 are connected in series across the anode output terminal 231 and the cathode output terminal 232 of the rectifier 23 in sequence, and the third semiconductor switch Q3 and the fourth semiconductor switch Q4 are connected in series across the anode output terminal 231 and the cathode output terminal 232 of the rectifier 23 in sequence. That is, a branch of the semiconductor switch Q1 and the second semiconductor switch Q2 and a branch of the third semiconductor switch Q3 and the fourth semiconductor switch Q4 are connected in parallel across the anode output terminal 231 and the cathode output terminal 232 of the rectifier 23. The first electrode terminal 103 and the second electrode terminal 104 of the single-phase direct current brushless motor 10 are respectively connected to a connection node N1 of the first semiconductor switch Q1 and the second semiconductor switch Q2 and a connection node N2 of the third semiconductor switch Q3 and the fourth semiconductor switch Q4.

The switch driver 33 is electrically connected to each of the first semiconductor switch Q1, the second semiconductor switch Q2, the third semiconductor switch Q3 and the fourth semiconductor switch Q4. In a case that the first trigger signal is received, the switch driver 33 drives the first semiconductor switch Q1 and the fourth semiconductor switch Q4 to be switched on and the second semiconductor switch Q2 and the third semiconductor switch Q3 to be switched off. In this case, the first electrode terminal 103 of the single-phase direct current brushless motor 10 is connected to the anode output terminal 231 of the rectifier 23 via the first semiconductor switch Q1 which is switched on, and the second electrode terminal 104 of the single-phase direct current brushless motor 10 is connected to the cathode output terminal 232 of the rectifier 23 via the fourth semiconductor switch Q4 which is switched on. Thereby, the inverter 31 in this case forms the first power supply path.

In a case that the second trigger signal is received, the switch driver 33 drives the second semiconductor switch Q2 and the third semiconductor switch Q3 to be switched on and the first semiconductor switch Q1 and the fourth semiconductor switch Q4 to be switched off. In this case, the first electrode terminal 103 of the single-phase direct current brushless motor 10 is connected to the cathode output terminal 232 of the rectifier 23 via the second semiconductor switch Q2 which is switched on, and the second electrode terminal 104 of the single-phase direct current brushless motor 10 is connected to the anode output terminal 231 of the rectifier 23 via the third semiconductor switch Q3 which is switched on. Thereby, the inverter 31 in this case forms the second power supply path.

Thus, as described above, the position detector and motor driver 32 alternately generates the first trigger signal and the second trigger signal, which enables the switch driver 33 to drive the inverter 31 to alternately establish the first power supply path and the second power supply path, thereby changing a direction of a current flowing through the stator 101 to drive the rotor 102 to keep rotating.

In the embodiment, the switch driver 33 is a MOSFET driver. At least one of the four semiconductor switches is a MOSFET. For example, all of the first semiconductor switch Q1, the second semiconductor switch Q2, the third semiconductor switch Q3 and the fourth semiconductor switch Q4 are MOSFETs, or some of the four semiconductor switches are MOSFETs and the others are IGBTs or triode BJTs. The switch driver 33 is connected to gates or bases of the first semiconductor switch Q1, the second semiconductor switch Q2, the third semiconductor switch Q3 and the fourth semiconductor switch Q4, and configured to drive the first semiconductor switch Q1, the second semiconductor switch Q2, the third semiconductor switch Q3 and the fourth semiconductor switch Q4 to be switched on or off correspondingly.

Figure 5:
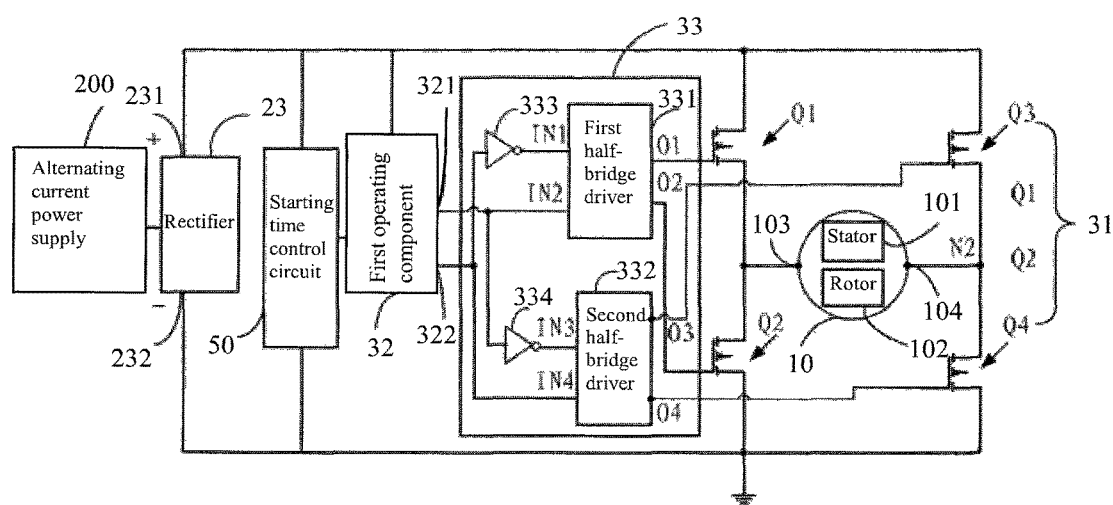
FIG. 5 is a more detailed circuit diagram of the electronic device in FIG. 4.

Reference is made to FIG. 5, which is a more detailed block circuit diagram the electronic device 100 according to an embodiment of present disclosure and schematically shows a specific structure of a switch driver 33. As shown in FIG. 5, the switch driver 33 includes a first half-bridge driver 331, a second half-bridge driver 332, a first phase inverter 333 and a second phase inverter 334. The position detector and motor driver 32 includes a first trigger terminal 321 and a second trigger terminal 322. The first half-bridge driver 331 includes a first input terminal IN1, a second input terminal IN2, a first output terminal O1 and a second output terminal O2. The second half-bridge driver 332 includes a first input terminal IN3, a second input terminal IN4, a first output terminal O3 and a second output terminal O4.

The first trigger terminal 321 of the position detector and motor driver 32 is connected to the second input terminal IN2 of the first half-bridge driver 331 and also connected to the first input terminal IN3 of the second half-bridge driver 332 via the second phase inverter 334. The second trigger terminal 322 of the position detector and motor driver 32 is connected to the first input terminal IN1 of the first half-bridge driver 331 via the first phase inverter 333, and the second trigger terminal 322 is also connected to the second input terminal IN4 of the second half-bridge driver 332.

The first output terminal O1 of the first half-bridge driver 331 is connected to the first semiconductor switch Q1, and configured to output a corresponding control signal to control the first semiconductor switch Q1 to be switched on or off. The second output terminal O2 of the first half-bridge driver 331 is connected to the second semiconductor switch Q2, and configured to output a corresponding control signal to control the second semiconductor switch Q2 to be switched on or off. The first output terminal O3 of the second half-bridge driver 332 is connected to the third semiconductor switch Q3, and configured to output a corresponding control signal to control the third semiconductor switch Q3 to be switched on or off. The second output terminal O4 of the second half-bridge driver 332 is connected to the fourth semiconductor switch Q4, and configured to output a corresponding control signal to control the fourth semiconductor switch Q4 to be switched on or off.

An output of the first output terminal O1 of the first half-bridge driver 331 follows a voltage inputted into the first input terminal IN1, and an output of the second output terminal O2 of the first half-bridge driver 331 is inverse to a voltage inputted into the second input terminal IN2. Similarly, an output of the first output terminal O3 of the second half-bridge driver 332 follows an input of the first input terminal IN3, and an output of the second output terminal O4 of the second half-bridge driver 332 is inverse to an input of the second input terminal IN4.

In a case that the position detector and motor driver 32 detects an N magnetic pole, the first trigger terminal 321 and the second trigger terminal 322 of the position detector and motor driver 32 respectively output a high level and a low level, that is, the position detector and motor driver 32 outputs a first trigger signal of "10". In a case that the position detector and motor driver detects an S magnetic pole, the first trigger terminal 321 and the second trigger terminal 322 of the position detector and motor driver 32 respectively output a low level and a high level, that is, the position detector and motor driver 32 outputs a second trigger signal of "01".

In an embodiment, all of the first semiconductor switch Q1, the second semiconductor switch Q2, the third semiconductor switch Q3 and the fourth semiconductor switch Q4 are switches which are switched on by a high level, such as NMOSFETs, NPNBJTs or the like.

Thereby, in a case that the position detector and motor driver 32 detects the N magnetic pole and a high level and a low level are respectively outputted by the first trigger terminal 321 and the second trigger terminal 322, the high level outputted by the first trigger terminal 321 is transmitted to the second input terminal IN2 of the first half-bridge driver 331 and inverted to generate a low level by the second phase inverter 334, and the low level is transmitted to the first input terminal IN3 of the second half-bridge driver 332. The low level outputted by the first trigger terminal 321 is transmitted to the second input terminal IN4 of the second half-bridge driver 332 and inverted to generate a high level by the first phase inverter 333, and the high level is transmitted to the first input terminal IN1 of the first half-bridge driver 331.

In this case, a high level is inputted into each of the first input terminal IN1 and the second input terminal IN2 of the first half-bridge driver 331, and a low level is inputted into each of the first input terminal IN3 and the second input terminal IN4 of the second half-bridge driver 332. As described above, a voltage of a first output terminal of a half-bridge driver follows that of a first input terminal, and a voltage of a second output terminal of the half-bridge driver is inverse to that of the second input terminal. Hence, the first output terminal O1 and the second output terminal O2 of the first half-bridge driver 331 respectively output a high level and a low level, to control the first semiconductor switch Q1 to be switched on and the second semiconductor switch Q2 to be switched off. The first output terminal O3 and the second output terminal O4 of the second half-bridge driver 332 respectively output a low level and a high level, to control the third semiconductor switch Q3 to be switched off and the fourth semiconductor switch Q4 to be switched on.

In this case, the first electrode terminal 103 of the single-phase direct current brushless motor 10 is connected to the anode output terminal 231 of the rectifier 23 via the first semiconductor switch Q1 which is switched on, and the second electrode terminal 104 of the single-phase direct current brushless motor 10 is connected to the cathode output terminal 232 of the rectifier 23 via the fourth semiconductor switch Q4 which is switched on. Thereby, the inverter 31 forms the first power supply path, and the current through the stator 101 of the single-phase direct current brushless motor 10 flows in a first flow direction.

In a case that the position detector and motor driver 32 detects the S magnetic pole and the first trigger terminal 321 and the second trigger terminal 322 respectively output a low level and a high level, the low level outputted by the first trigger terminal 321 is transmitted to the second input terminal IN2 of the first half-bridge driver 331, and inverted to generate a high level by the second phase inverter 334, and the high level is transmitted to the first input terminal IN3 of the second half-bridge driver 331. The high level outputted by the second trigger terminal 322 is transmitted to the second input terminal IN4 of the second half-bridge driver 332, and inverted to generate a low level by the first phase inverter 333, and the low level is transmitted to the first input terminal IN1 of the first half-bridge driver 331.

In this case, a low level is inputted into each of the first input terminal IN1 and the second input terminal IN2 of the first half-bridge driver 331, and a high level is inputted into each of the first input terminal IN3 and the second input terminal IN4 of the second half-bridge driver 332. Correspondingly, the first output terminal O1 and the second output terminal O2 of the first half-bridge driver 331 respectively output a low level and a high level, to control the first semiconductor switch Q1 to be switched off and the second semiconductor switch Q2 to be switched on. The first output terminal O3 and the second output terminal O4 of the second half-bridge driver 332 respectively output a high level and a low level, to control the third semiconductor switch Q3 to be switched on and the fourth semiconductor switch Q4 to be switched off.

In this case, the first electrode terminal 103 of the single-phase direct current brushless motor 10 is connected to the cathode output terminal 232 of the rectifier 23 via the second semiconductor switch Q2 which is switched on, and the second electrode terminal 104 of the single-phase direct current brushless motor 10 is connected to the anode output terminal 231 of the rectifier 23 via the third semiconductor switch Q3 which is switched on. Thereby, the inverter 31 forms the second power supply path, and the current through the stator 101 of the single-phase direct current brushless motor 10 flows in a second flow direction which is opposite to the first flow direction.

The first half-bridge driver 331 and the second half-bridge driver 332 are configured to boost the high level or the low level outputted by the position detector and motor driver 32 so as to drive a MOSFET which requires a great current to drive. In a case that there is no MOSFET in the inverter 31, the first semiconductor switch Q1, the second semiconductor switch Q2, the third semiconductor switch Q3 and the fourth semiconductor switch Q4 can be directly driven by trigger signals outputted by the position detector and motor driver 32 to be switched on or off, without the first half-bridge driver 331 and the second half-bridge driver 332, that is, without the switch driver 33. For example, the first trigger terminal 321 of the position detector and motor driver 32 is connected to the first semiconductor switch Q1 and the fourth semiconductor switch Q4, and controls the first semiconductor switch Q1 and the fourth semiconductor switch Q4 to be switched on or off at the same time; and the second trigger terminal 322 of the position detector and motor driver 32 is connected to the second semiconductor switch Q2 and the third semiconductor switch Q3, and controls the second semiconductor switch Q2 and the third semiconductor switch Q3 to be switched on or off at the same time.

In a preferred embodiment, the first half-bridge driver 331 and the second half-bridge driver 332 each may be an IR2103 chip. The position detector and motor driver 32 may be a Hall effect controller, which includes a Hall sensor and a corresponding control module and may be an AH284 chip. The Hall effect controller chip includes at least four pins, that is, the first trigger terminal 321, the second trigger terminal 322, as described above, a power pin and a ground pin, and the power pin and the ground pin are electrically connected to the anode output terminal 231 and the cathode output terminal 232 of the rectifier 23, respectively. Alternatively, the position detector and motor driver 32 may include a current sensor and a corresponding control module, which determines the N magnetic pole and the S magnetic pole by detecting changes of the current and outputs corresponding control signals. The first half-bridge driver 331, the second half-bridge driver 332 and the position detector and motor driver 32 may also be any other suitable chips, and the chips listed above are only intended to be a reference for practical implementations.

In a case that the switch driver 33 includes the first half-bridge driver 331 and the second half-bridge driver 332, the starting voltage of the second operating component 3 (that is, the switch driver 33) refers to a starting voltage of the first half-bridge driver 331 and the second half-bridge driver 332.

Positional relationships between the components in the drawing of the present disclosure are only electrical and logical relationships rather than represent an arrangement of the components in a product.

The above-described embodiments are only some preferred embodiments of the invention, which do not limit the invention in any form. In addition, modifications may be made by those skilled in the art within the spirit of the present disclosure, and of course, the modifications made within the spirit of the present disclosure shall fall within the scope of the present disclosure.

For example, in more embodiments, the starting time of the first operating component can be delayed to be synchronous with that of the second operating component with any other suitable time delay circuit other than the starting time control circuit according to the embodiments above.

The invention claimed is:

1. An electronic device, comprising a motor and a motor drive circuit, wherein the motor drive circuit comprises a first operating component and a second operating component, wherein,
   the motor drive circuit further comprises a time delay circuit configured to delay a starting time of the first operating component to be synchronous with that of the second operating component; thereby enabling the first operating component and the second operating component to be synchronously started;
   wherein the electronic device further comprises a rectifier, wherein,
   the rectifier comprises a first output terminal and a second output terminal; and
   the time delay circuit is connected in series with the first operating component, a series branch of the time delay circuit and the first operating component is connected in parallel with the second operating component across the first output terminal and the second output terminal, and the time delay circuit is configured to adjust a voltage outputted by the first output terminal and provide the adjusted voltage for the first operating component, so that a voltage provided for the first operating component rises to a first preset value that enables starting of the first operating component when a voltage provided for the second operating component by the first output terminal rises to a second preset value that enables starting of the second operating component.

2. The electronic device according to claim 1, wherein the time delay circuit comprises a voltage division unit and a power-on unit, the voltage division unit has a turn-on voltage, and is turned on and clamped at the turn-on voltage in a case that a voltage applied to the voltage division unit is higher than or equal to the turn-on voltage, and the power-on unit is configured to generate a voltage and provide the voltage for the first operating component, after the voltage division unit is turned on, wherein a sum of the turn-on voltage of the voltage division unit and the first preset value is equal to the second preset value.

3. The electronic device according to claim 1, further comprising an inverter connected the motor, wherein the first operating component is a position detector and a motor driver configured to detect a rotational position of a rotor of the motor and output trigger signals, the second operating component is a switch driver configured to drive the inverter to convert a direct current into an alternating current.

4. The electronic device according to claim 1, wherein the first preset value is lower than that of the second preset value.

5. The electronic device according to claim 1, wherein the motor is a single phase direct current brushless motor.

6. The electronic device according to claim 2, wherein the voltage division unit comprises a Zener diode, the power-on unit comprises a resistor, a cathode of the Zener diode is electrically connected to the first output terminal, an anode of the Zener diode is electrically connected to the first operating component and electrically connected to the second output terminal via the resistor, and a breakdown voltage of the Zener diode is a difference between the first preset value and the second preset value.

7. The electronic device according to claim 3, wherein the inverter is an H-bridge circuit comprising a number of semiconductor switch transistors, the semiconductor switch transistors are MOSFETs, and the switch driver is a MOSFET driver.

8. The electronic device according to claim 7, wherein,
the switch driver comprises a first half-bridge driver, a second half-bridge driver, a first phase inverter and a second phase inverter, the position detector and motor driver comprises a first trigger terminal and a second trigger terminal, the first half-bridge driver comprises a first input terminal, a second input terminal, a first output terminal and a second output terminal, and the second half-bridge driver comprises a first input terminal, a second input terminal, a first output terminal and a second output terminal;

the first trigger terminal of the position detector and motor driver is connected to the second input terminal of the first half-bridge driver and connected to the first input terminal of the second half-bridge driver via the second phase inverter;

the second trigger terminal of the position detector and motor driver is connected to the first input terminal of the first half-bridge driver via the first phase inverter and connected to the second input terminal of the second half-bridge driver; and the first output terminal and the second output terminal of the first half-bridge driver and the first output terminal and the second output terminal of the second half-bridge driver are respectively connected to first to fourth semiconductor switch transistors.

9. The electronic device according to claim 8, wherein,
an output of the first output terminal of the first half-bridge driver follows a voltage inputted into the first input terminal of the first half-bridge driver, and an output of the second output terminal of the first half-bridge driver is inverse to a voltage inputted into the second input terminal of the first half-bridge driver; and an output of the first output terminal of the second half-bridge driver follows an input of the first input terminal of the second half-bridge driver, and an output of the second output terminal of the second half-bridge driver is inverse to an input of the second input terminal of the second half-bridge driver.

10. A circuit, comprising a first operating component, a second operating component and a starting time control circuit, wherein, a first starting voltage that enables starting of the first operating component is different from a second starting voltage that enables starting of the second operating component, and the starting time control circuit is configured to regulate a starting time of the first operating component to be synchronous with that of the second operating component, wherein the starting time control circuit is connected in series with the first operating component, a series branch of the starting time control circuit and the first operating component is connected in parallel with the second operating component across a direct voltage, and the starting time control circuit is configured to adjust the direct voltage and provide the adjusted voltage for the first operating component, so that a voltage provided for the first operating component rises to the first starting voltage when a voltage provided for the second operating component rises to the second starting voltage.

11. The circuit according to claim 10, wherein the starting time control circuit comprises a voltage division unit and a power-on unit, the voltage division unit has a turn-on voltage, and is turned on and clamped at the turn-on voltage in a case that a voltage applied to the voltage division unit is higher than or equal to the turn-on voltage, and the power-on unit is configured to generate a voltage and provide the voltage for the first operating component, after the voltage division unit is turned on, wherein a sum of the turn-on voltage of the voltage division unit and the first starting voltage is equal to the second starting voltage.

12. The circuit according to claim 11, wherein the voltage division unit comprises a Zener diode, the power-on unit comprises a resistor, a cathode of the Zener diode is electrically connected to an anode output terminal, an anode of the Zener diode is electrically connected to the first operating component and electrically connected to a cathode output terminal of the rectifier via the resistor, and a breakdown voltage of the Zener diode is a difference between the second starting voltage and the first starting voltage.

* * * * *